United States Patent
Bell et al.

(10) Patent No.: US 6,474,405 B1
(45) Date of Patent: Nov. 5, 2002

(54) REFRIGERATION UTILIZED TO COOL DRIVELINE LUBRICANTS

(75) Inventors: Dale K. Bell, Ortonville, MI (US); Ronald N. Brissette, Lake Orion, MI (US); Christopher S. Keeney, Troy, MI (US); Dennis A. Kramer, Troy, MI (US); Jack R. McKenzie, Hendersonville, NC (US); Brian J. Mueller, Lake Orion, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/669,381

(22) Filed: Sep. 26, 2000

(51) Int. Cl.[7] ............................. F01P 11/08; F16N 17/04
(52) U.S. Cl. ............................. 165/41; 165/51; 165/916; 62/84; 62/192; 62/468; 184/6.12; 184/104.3; 74/606 A; 180/339
(58) Field of Search ................... 165/44, 47, 51, 165/916; 384/462, 473; 62/84, 468, 469, 192, 193, 352; 184/6.12, 6.14, 6.16, 11.2, 104.3; 74/467, 606 A; 123/196 AB; 180/339

(56) References Cited

U.S. PATENT DOCUMENTS

| | | | | |
|---|---|---|---|---|
| 1,131,130 A | * | 3/1915 | Hapgood | |
| 1,870,458 A | * | 8/1932 | Kenney | |
| 2,418,853 A | * | 4/1947 | Shoemaker | 62/193 X |
| 2,963,886 A | * | 12/1960 | Palmatier | |
| 3,729,064 A | * | 4/1973 | Wolf et al. | 184/6.14 |
| 4,198,819 A | * | 4/1980 | Bourne | |
| 4,393,922 A | * | 7/1983 | Bahrle et al. | 165/51 X |
| 4,497,185 A | * | 2/1985 | Shaw | 62/468 |
| 4,530,215 A | * | 7/1985 | Kramer | 62/84 |
| 4,551,989 A | * | 11/1985 | Lindahl et al. | 62/468 |
| 4,633,938 A | * | 1/1987 | Schunck et al. | 165/47 |
| 4,856,915 A | * | 8/1989 | Ryan | 384/473 |
| 4,861,187 A | * | 8/1989 | Sinkkonen | 165/51 X |
| 5,072,784 A | * | 12/1991 | Stenlund | 165/47 |
| 5,350,039 A | * | 9/1994 | Voss et al. | 184/6.16 |
| 5,435,144 A | * | 7/1995 | Kalmbach | 62/84 |
| 5,460,005 A | * | 10/1995 | Eden | 62/468 X |
| 5,505,112 A | * | 4/1996 | Gee | 184/6.12 X |
| 5,535,850 A | | 7/1996 | Tar et al. | |
| 5,540,300 A | | 7/1996 | Downs et al. | |
| 5,694,784 A | * | 12/1997 | Frey et al. | 62/470 X |
| 5,749,439 A | * | 5/1998 | Van Maanen | 184/6.12 |
| 5,839,327 A | | 11/1998 | Gage | |
| 5,931,218 A | * | 8/1999 | Carlson et al. | 165/47 |
| 6,131,834 A | * | 10/2000 | Teeter | 184/6.12 X |
| 6,216,772 B1 | * | 4/2001 | Johannesson | 165/51 X |

* cited by examiner

*Primary Examiner*—Ljiljana Ciric
(74) *Attorney, Agent, or Firm*—Carlson, Gaskey & Olds

(57) ABSTRACT

A refrigerant fluid is placed within a driveline component, and in particular an axle housing. This refrigerant fluid is received within a sealed reservoir such that it is sealed from the typical lubricant in the driveline component. The lubricant heats the refrigerant through a housing such that the refrigerant vaporizes within the driveline component housing, thus cooling the lubricant. The vaporized refrigerant travels to a cooling chamber mounted remotely from the reservoir. The cooled refrigerant is cooled to a liquid state, and then returned to the reservoir. Preferably the cooling chamber is positioned on the vehicle frame vertically above the driveline component.

13 Claims, 2 Drawing Sheets

REFRIGERATION UTILIZED TO COOL DRIVELINE LUBRICANTS

BACKGROUND OF THE INVENTION

This invention relates to the use of a refrigerant cycle to cool a lubricant in a driveline component such as an axle or a transmission.

In driveline components, a number of parts rotate relative to other parts at relatively high speeds. A lubricant is typically deposited into a component housing to cool as well lower friction between these rotating parts. During operation of a vehicle incorporating such a component, the temperature of the lubricant will frequently become quite high.

Various methods have been disclosed to cool the lubricant. As an example, it has been proposed to pump the lubricant out of the axle housing for cooling. In these systems, separate lubricant coolers and associated flow lines, have been proposed.

However, these systems add too much cost and extract power from the vehicle.

SUMMARY OF THE INVENTION

In a disclosed embodiment of this invention, an effective refrigerant cycle is utilized to cool a lubricant in a driveline component. In particular, an enclosed reservoir including a second fluid distinct from the lubricant is provided in a housing which receives the driveline component. The lubricant is in contact with the reservoir. Heat is transferred from the refrigerant to the lubricant, resulting in heating of the refrigerant and cooling of the lubricant.

The refrigerant vaporizes and is driven from the reservoir through flow lines to a cooling chamber. Preferably, the cooling chamber is placed at a location where it will be exposed to cooling airflow. The cooling chamber acts as a condenser. The refrigerant becomes liquefied and returns to the reservoir. In a disclosed embodiment, the driveline component is an axle housing, including a differential associated housing structure, axle shafts, etc. Most preferably, the reservoir is positioned within an end cap housing of the axle, and outwardly of the differential. Typically, a drive pinion for the differential is located on one lateral side of this bowl cover, and a space is provided on the other lateral side of the end housing. The reservoir is preferably positioned into this space. Thus, no significant additional space is required for the inclusion of the second refrigerant.

These and other features of the present invention can be best understood from the following specification and drawings, the following of which is a brief description.

DETAILED DESCRIPTION OF A PREFERRED EMBODIMENT

Figure 1:
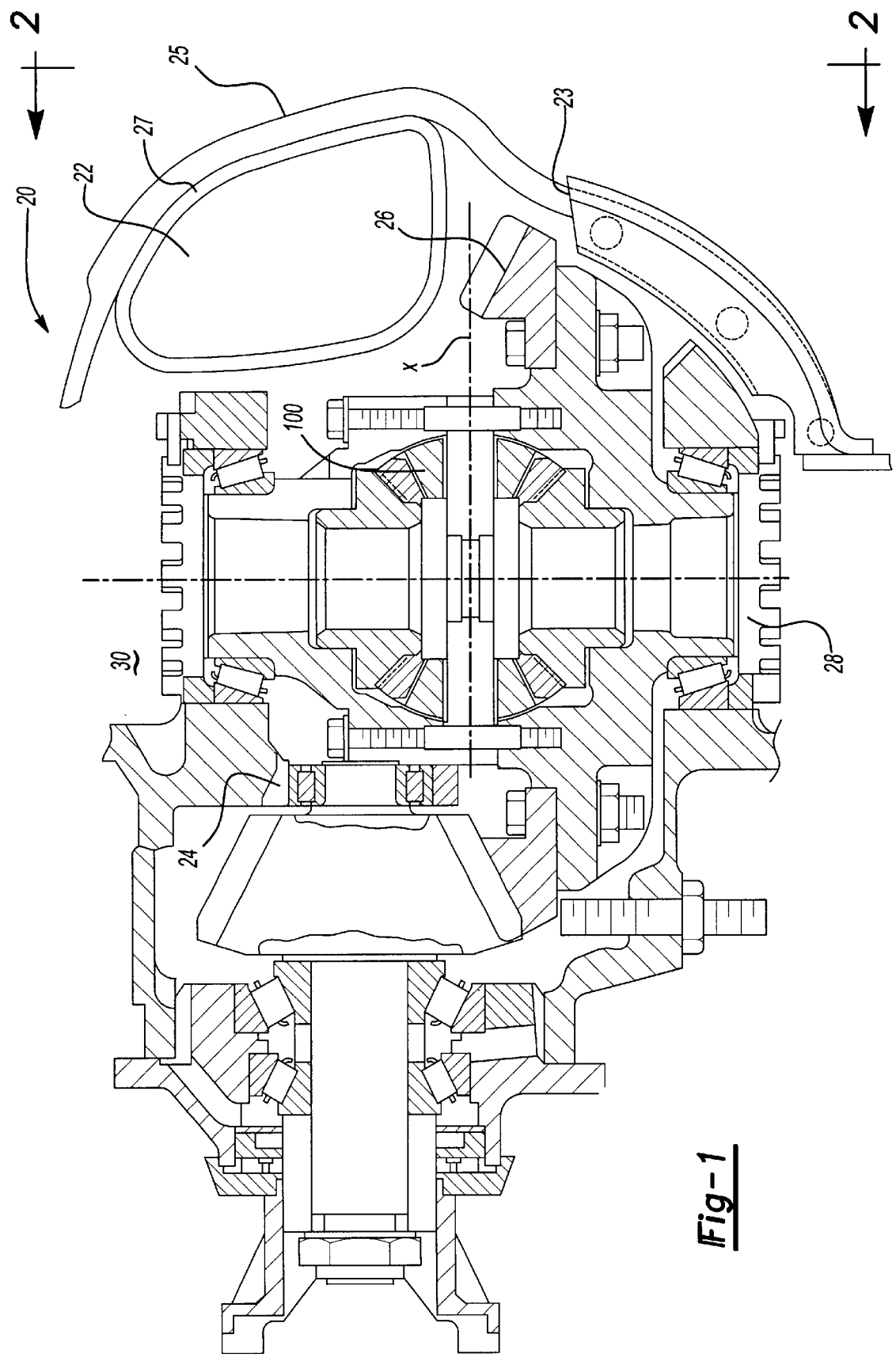
FIG. 1 is a plan view of an axle housing incorporating this invention.

FIG. 1 shows a top view of an axle housing 20 incorporating refrigerant reservoir 22. A bowl cover housing 23 has an outwardly deformed portion 25 to provide space for the reservoir 22. A differential 24 having a drive pinion 26 is also positioned within the axle housing 20. As can be appreciated, the drive pinion 26 is on one lateral side of an axis X of the differential, while the reservoir 22 is on an opposed side of the axis X. The axis X is the rotational axis of the spider gear 100. The reservoir 22 is positioned within a space that would otherwise not be utilized. Little additional space is thus required. The bowl cover housing 23 has an outwardly jutting portion 25 to provide room for this reservoir 22 such that it can have additional volume. As known, ends 28 and 30 are attached to axles which extend to vehicle wheels.

Figure 2:
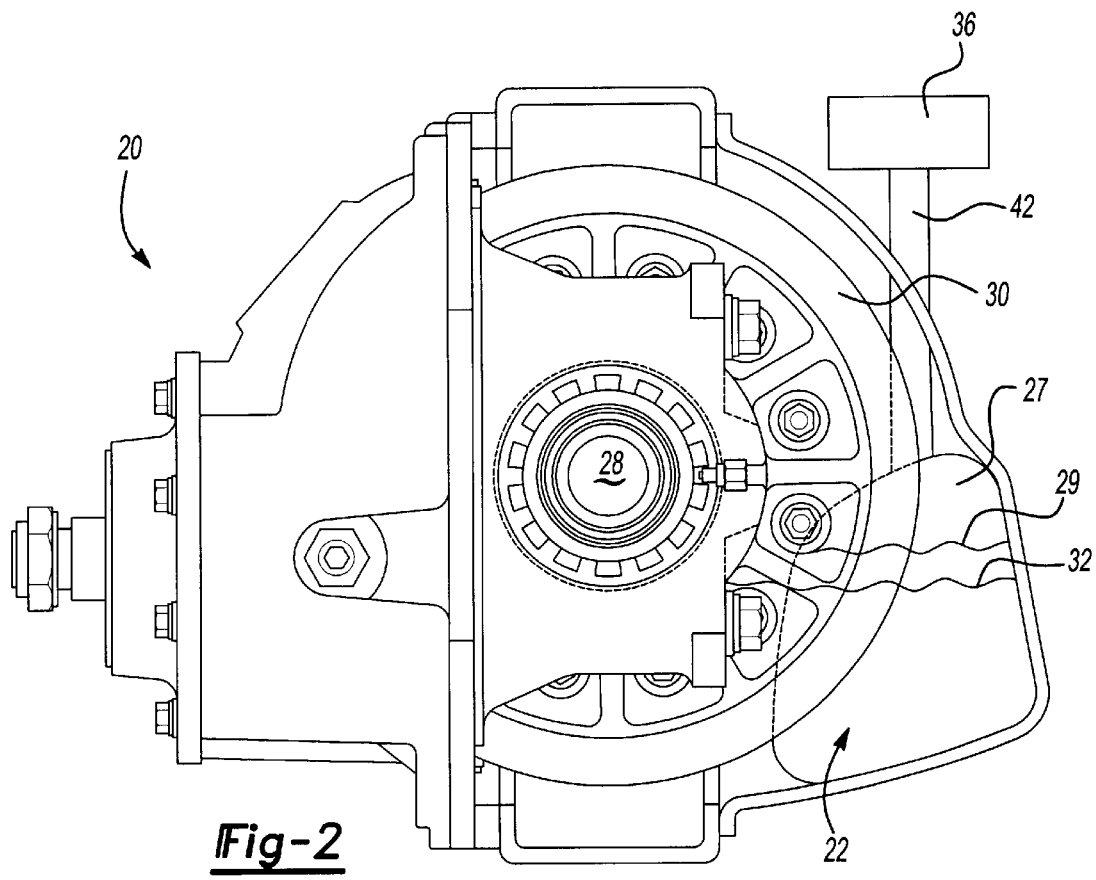
FIG. 2 is a cross-sectional view through the FIG. 1 axle housing.

FIG. 2 is a cross-sectional view through FIG. 1. The reservoir 22 is positioned to be in contact with the lubricant level 32. The lubricant within the axle housing 20 is heated during operation of the vehicle, and that heat is transmitted through the housing 27 of the reservoir 22. An entrapped refrigerant 29 within the reservoir 22 is then heated and may become vaporized.

Figure 3:
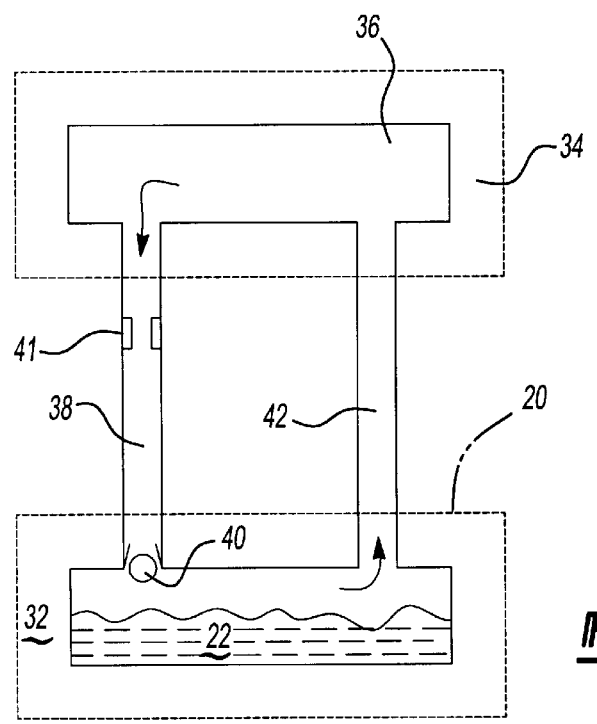
FIG. 3 is a schematic view of a refrigerant cycle incorporated into an axle housing.

As shown in FIG. 3, the reservoir 22 is provided with a fluid flow line 42 leading to a cooling chamber 36. Cooling chamber 36 is preferably mounted on a vehicle frame 34. The vehicle frame 34 is preferably positioned above the axle housing 20 such that fluid must flow upwardly through the line 42. Again, this fluid will preferably be vaporized from the heat taken from the lubricant 32, and thus will travel upwardly through the line 42. That is, no separate pump is required for moving the refrigerant between the reservoir 22 and the chamber 36. A location for the cooling chamber 36 is selected such that it is preferably subject to ambient air flow during operation of the vehicle. The vapor having reached the cooling chamber 36 will be cooled and again liquify, and return through a line 38 back to the reservoir 22. As shown, a check valve 40 may prevent flow of the refrigerant upwardly into the line 38. Further, a restriction 41 may meter liquid refrigerant returned. As can be appreciated from FIGS. 2 and 3, flow lines 38 and 42 extend through end cap 23.

Although any appropriate refrigerant, or any appropriate fluid which has the ability to turn between vapor and liquid at appropriate temperatures a DEXCOOL™ brand of antifreeze in a 50/50 solution with water may well be the most preferred refrigerant. However, other fluids would come within the scope of this invention. As examples only, the refrigerant will preferably be a liquid down to approximately −30° F. but a gas at approximately 220° F. With such responsive temperatures, the lubricant will typically be adequately cooled for purposes of this invention.

The housing for the reservoir 22 and the cooling chamber 36 are preferably selected such that they have good heat transfer characteristics. As an example, an appropriate metal will preferably be utilized. While the invention is shown in an axle housing, it will have application in other driveline component housings such as a transmission, etc.

Although a preferred embodiment of this invention has been disclosed, a worker in this art would recognize that certain modifications would come within the scope of this invention. For that reason, the following claims should be studied to determine the true scope and content of this invention.

What is claimed is:

1. A driveline component comprising:
   a housing receiving a lubricant, and rotating parts cooled by said lubricant;
   an enclosed reservoir within said housing and in contact with said lubricant;
   a first flow line from said enclosed reservoir to a cooling chamber, and a second flow line from said cooling chamber back to said reservoir, a fluid refrigerant, distinct from said lubricant, being received in said reservoir and flowing through said first flow line to said cooling chamber and back through said second flow line to said reservoir; and said refrigerant being selected such that it will vaporize within operational temperatures expected in said housing, and said vaporized refrigerant driving itself into said cooling chamber where it is cooled back to a liquid, and returns to said reservoir.

2. The driveline component as recited in claim 1, wherein said driveline component axle housing, and a differential is among said rotating parts.

3. A driveline component as recited in claim 2, wherein a drive pinion is positioned within said housing on one lateral side of an axis defined by spider gears driven by said housing, and said reservoir is positioned on an opposed side of said axis.

4. A driveline component as set forth in claim 1, wherein said second flow line includes a check valve to prevent flow from said reservoir to said cooling chamber.

5. A driveline component as set forth in claim 4, wherein said second flow line further includes a flow restriction.

6. A driveline component as set forth in claim 1, wherein said cooling chamber is positioned vertically above said driveline housing.

7. A driveline component as set forth in claim 6, wherein said cooling chamber is mounted on a vehicle frame member where said cooling chamber will be exposed to ambient air flow.

8. A driveline component as recited in claim 1, wherein said cooling chamber is positioned outwardly of said housing.

9. A driveline component as recited in claim 1, wherein said flow between said reservoir and said cooling chamber of said refrigerant is driven by the vaporized refrigerant itself, and requires no pump.

10. A driveline component comprising:

a housing receiving a lubricant, and rotating parts cooled by said lubricant;

an enclosed reservoir within said housing and in contact with said lubricant;

a first flow line from said enclosed reservoir to a cooling chamber, and a second flow line from said cooling chamber back to said reservoir, a fluid refrigerant, distinct from said lubricant, being received in said reservoir and flowing through said first flow line to said cooling chamber and back through said second flow line to said reservoir;

said driveline component being an axle housing and a differential being among said rotating parts, a drive pinion positioned within said housing on one side of an axis defined by a rotational axis of spider gears associated with said housing, and said reservoir being positioned on an opposed side of said axis; and an end cap housing secured to an axle housing, said reservoir being positioned inwardly of said end cap housing and within said axle housing.

11. A driveline component as recited in claim 10, wherein said reservoir is in contact with said end cap housing.

12. A driveline component comprising:

a housing receiving a lubricant, and rotating parts cooled by said lubricant;

an enclosed reservoir within said housing and in contact with said lubricant;

a first flow line from said enclosed reservoir outwardly of said housing and to a cooling chamber, and a second flow line from said cooling chamber back to said reservoir, and a fluid refrigerant, distinct from said lubricant, being received in said reservoir and flowing through said first flow line to said cooling chamber and back through said second flow line to said reservoir;

said cooling chamber being positioned vertically above said reservoir; and said refrigerant being selected such that it will vaporize within operational temperatures expected in said housing, and said vaporized refrigerant driving itself into said cooling chamber where it is cooled back to a liquid, and returns to said reservoir.

13. A driveline component as recited in claim 12, wherein said flow between said reservoir and said cooling chamber of said refrigerant is driven by the vaporized refrigerant itself, and requires no pump.

* * * * *